June 13, 1961  B. A. BANG ET AL  2,988,644
LIGHT FILTER FOR TELEVISION PICKUP TUBES AND THE LIKE
Filed March 14, 1958  3 Sheets-Sheet 1

INVENTORS
BERNHARD A. BANG
W. EDWARD DILL
ROBERT A. LEE
BY K. G. Doub
ATTORNEY

June 13, 1961  B. A. BANG ET AL  2,988,644
LIGHT FILTER FOR TELEVISION PICKUP TUBES AND THE LIKE
Filed March 14, 1958   3 Sheets-Sheet 2
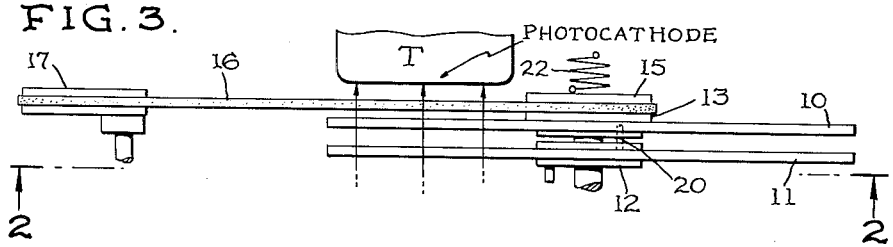
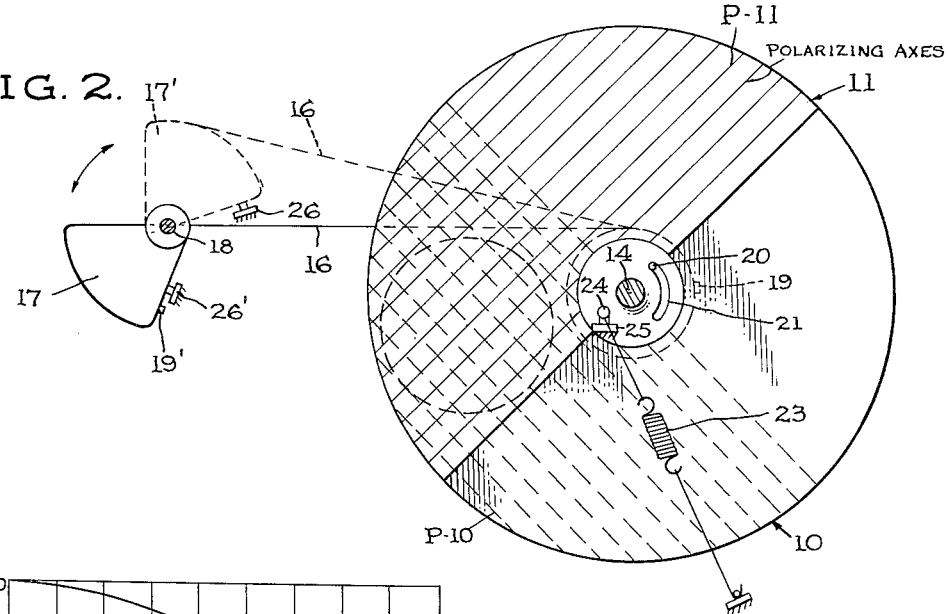
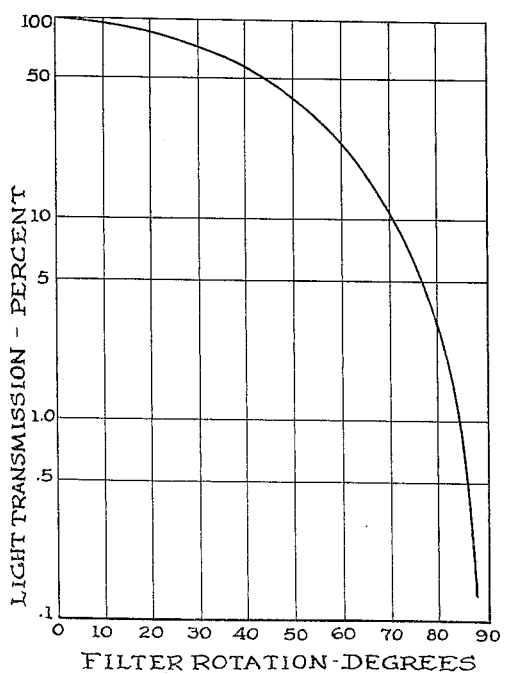
FIG. 6.
INVENTORS
BERNHARD A. BANG
W. EDWARD DILL
ROBERT A. LEE
BY K. G. Doub
ATTORNEY ated June 13, 1961

2,988,644
LIGHT FILTER FOR TELEVISION PICKUP TUBES AND THE LIKE

Bernhard A. Bang, Baltimore, William E. Dill, Pikesville, and Robert A. Lee, Timonium, Md., assignors to The Bendix Corporation, a corporation of Delaware
Filed Mar. 14, 1958, Ser. No. 721,422
12 Claims. (Cl. 250—205)

This invention relates to polarized light filters for regulating the intensity of available light admitted to the photocathode of a television pickup tube and other light-sensitive objects or surfaces.

In the past, numerous types of filters for regulating the intensity of light admitted to the light-sensitive photographic films of cameras, the photocathodes of television pickup tubes, and other light-sensitive surfaces have been proposed and certain of these have been used commercially. As far as known, however, certain objectionable features still exist in these prior art structures. For example, it is highly desirable, particularly in a television pickup tube, that the intensity of the light admitted to the photocathode or other light-sensitive surface be uniform throughout the effective surface area of such surface, otherwise the contrast and resolution of the resultant picture will suffer; the movable filter elements should require a minimum of travel to cover the complete filtering range; the driving means for resetting the filter as the available light varies should require a minimum of electrical power and be sensitive to changes in light and act quickly to respond to such changes; and the filter mechanism as a whole should be relatively simple and free of complex operating components.

An object of the present invention, therefore, is to provide an improved light filter of the type specified embodying movable filter components coacting to insure the admission of light of the proper density uniformly across the entire effective area of a light-sensitive surface.

Another object is to provide a light filter particularly adapted for television pickup tubes and the like utilizing filter elements which will provide uniform density of light admitted to the entire effective surface area of the photocathode of the tube and combined mechanical and electrical driving mechanism which will regulate the filter elements automatically and quickly in relation to changes in the available light to which the tube may be exposed while at the same time requiring a minimum of power consumption.

Another object is to generally improve light filters for television pickup tubes and the like.

In practice, a specific arrangement of the improved filter incorporates coacting movable light polarizing members in the form of a pair of transparent axially-aligned supporting discs mounted for relative angular positioning on a common shaft and each provided with a 180 degree segment or film of light-polarizing material. The principle of operation is based on the known phenomenon that in a film of perfectly-polarized material, the vibrational component of light perpendicular to the polaroid axes of the film is absorbed while that which is parallel to said axes is allowed to pass through said film. These segmental discs are automatically controlled to move coacting polarized segments thereof in overlapped relation into and out of the path of light to which the photocathode of the television tube is exposed. When the discs are in a position of minimum light transmissibility, the polaroid axes of their films are perpendicular to each other, and as the light fades, the discs gradually rotate to a position of maximum light transmissibility, during which said axes are oriented into parallel relationship, until at low light levels where no light filtration is necessary or desirable, the polarizing segments are moved entirely clear of the light path. The discs are rotatably or angularly positioned by a combined mechanical and electrical drive mechanism which is responsive to changes in photocathode current, the arrangement being such as to produce either clockwise or counterclockwise rotation of the discs at a rate which will continually maintain the latter in a position for the most efficient and safe operation of the pickup tube with a minimum of lag. The filter discs are each preferably made up of a complete circle of glass or clear plastic having substantially the same predetermined refraction properties throughout with a 180 degree segment of polarizing film coacting with half of each disc. This arrangement insures correct refraction of light from the lens system at all relative angular positions of the discs.

The foregoing and other objects and advantages will become apparent in view of the following description taken in conjunction with the drawings, wherein:

FIG. 2 is a view in elevation taken substantially on the line 2—2, FIG. 3;

FIG. 3 is a top plan view of FIG. 2;

FIGS. 6, 7 and 8 are additional curve charts illustrating the operation of the rotatable polarized filter discs.

Figure 1:
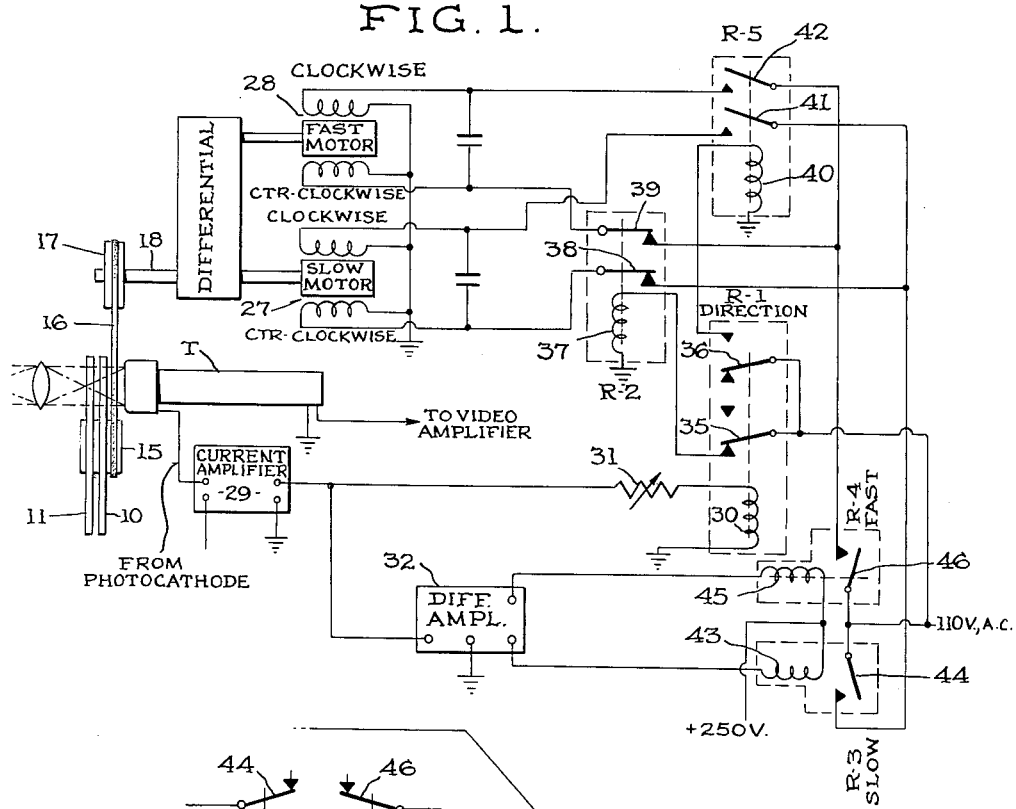
FIG. 1 is a schematic view of a filter or light intensity control system in accordance with the invention.

First considering the filter assembly per se, and referring more or less in detail to FIGS. 1, 2 and 3, a pair of light-polarized filter discs 10 and 11 are provided, each having an effective polarizing area P-10 and P-11 of substantially 180 degrees (note etched segments), the remaining section of each disc being highly transparent. A type of disc which has proved practicable consists of a 180 degree segment made up of highly transparent laminations of glass or plastic with a sheet of polarized material sandwiched therebetween; the remaining disc segment being comprised of glass or clear plastic. The refractive properties of the glass or plastic throughout the entire circle are such as to maintain the original preset focus of light rays from the lens system to the photocathode at all relative angular positions of the discs. These discs are each formed with a center hole in which are secured hub members 12 and 13 by means of which the filter discs are mounted for free rotation on a supporting shaft 14. The filter disc 11 is shown mounted in front of its coacting disc 10 in FIGS. 1, 2 and 3, considered in the direction of light transmission. The hub 13 is extended axially in a rearward direction and formed with a pulley or drum 15, which has a driving connection by means of a flexible tape 16 with a rotatable control member in the nature of a cam 17, secured on an input drive shaft 18. This tape has its one extremity trained over the pulley or drum 15 and secured thereto as by a screw 19 and its opposite extremity trained over the cam 17 and secured thereto by screw 19'. When the cam 17 rotates, it cooperates with a torsion spring 22 to drive the disc 10, the said discs 10 and 11 being driveably connected to one another for rotation in unison after the disc 10 has been driven through a predetermined range, for a purpose to be described. In the example shown, such connecting means consist of a pin 20, which is anchored at its one end in the hub 13 of disc 10 and projects outwardly and terminates in an arcuate slot 21 formed in the hub 12 which carries the disc 11.

In FIGS. 1, 2 and 3, the filter discs are shown in a position for maximum light attenuation or minimum light transmission (bright daylight operation, for example) to the photocathode surface of a television pickup tube, indicated at T. In this position the 180 degree polarized filter segments of the discs overlap one another by approximately 90 degrees. Spring 22, note FIG. 3, functions to bias the inner disc 10 in a clockwise direction against the holding action of the tape 16, so that when the cam 17 is rotated in a similar direction, the said inner disc will be rotated in a clockwise direction by the torsion force of the said spring. The outer disc 11, however, during a predetermined degree of rotation of the inner disc 10 as determined by the effective length of arcuate slot 21, will be held relatively fixed or stationary by means of a spring 23, which is anchored at one end to a relatively fixed part of the adjacent frame structure and at its opposite end is secured to a pin 24 anchored to the hub of the outer disc 11. As the cam 17 continues to rotate in a clockwise direction, the pin 20 will abut the end of the arcuate slot 21, and when this point has been reached, the filter discs will rotate in unison. As will be hereinafter explained, spring 23 is weaker or has less holding force than spring 22 to permit rotation in unison of the discs 10 and 11 for clear unobstructed light entrance to the pickup tube T when all available outside light is needed to maintain a best operating condition. When the discs are in a position of minimum light transmission (high exterior light level) the polarizing axes of the polarizing material or film carried by segments P-10 and P-11 are substantially perpendicular; and as filter disc 10 rotates relatively to resiliently anchored disc 11, the said axes gradually move into parallel relationship, and when P-10 fully overlaps P-11, the polarizing axes become parallel and a maximum light transmission or minimum light attenuation position exists. This is the position where pin 20 abuts the lower end of slot 21, and it is also the position where the 180 degree clear or unpolarized segment of one disc registers with the like segment of the other disc.

From a practical standpoint, the polarized filter segments P-10 and P-11, even with their polarizing axes parallel, produce a certain amount of light attenuation which is undesirable during low light-level conditions, such as at night with little or no artificial light available. Hence should cam 17 be driven further in a clockwise direction, the two discs 10 and 11 will rotate in unison and the polarized segments P-10 and P-11 will move clear of the light input end of the television pickup tube and the latter will then be exposed to the full intensity of the outside light through the clear unpolarized segments of the discs.

When the discs 10 and 11 have been rotated to a position of maximum light attenuation (the position shown in FIG. 2) pin 24 is brought up against the stop 25. Other stops 26 and 26' determine the extreme clockwise and counterclockwise positions of the cam 17.

Figure 7:
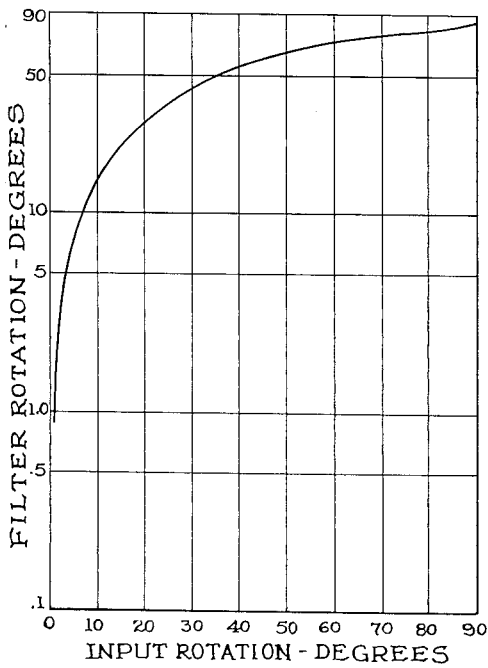
Figure 8:
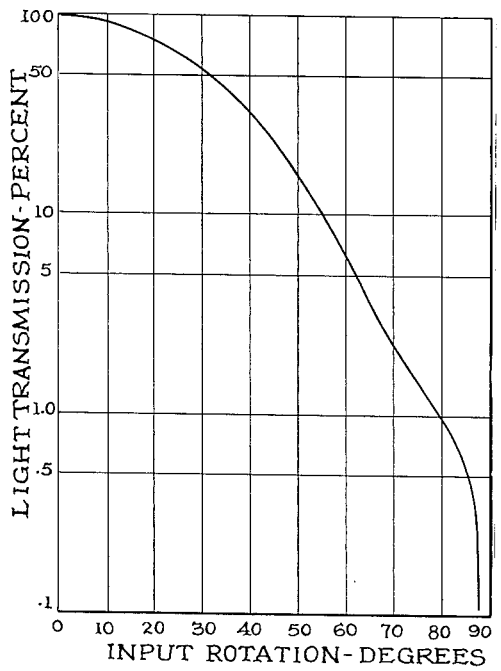

Light passing through the two coacting polarized filter disc segments is regulated in relation to a cosine-squared curve of the angular cyrstalline axes in the filters. In FIG. 6 is plotted a light transmission v. filter rotation curve. Note that for a very small rotation of one filter segment with respect to the other through the 80 to 90 degree range, there is a relatively large change in the percentage of light transmission. It is desirable to have the filter transmission vary in a substantially linear fashion with variations in the light input signal through this minimum driving range. Accordingly a drive mechanism was developed which would rotate the filter discs in a manner such as to produce a reasonably linear input signal v. light transmission curve. Hence cam 17 is contoured to generate rotation in accordance with a modified sine function as shown in FIG. 7, which illustrates the action of the cam through 90 degrees of rotation of one filter disc while the other remains substantially fixed or is held against rotation. The cam, when operated through its full cycle, permits approximately 90 degrees of rotation of one segment with respect to the other, during which the filtering action has a substantially linear characteristic. This takes place when point 17' on the cam rotates 90 degrees from the position shown in FIG. 2. The combination of the motion produced by the cam as shown in FIG. 7 and the light transmission action of the filter as shown in FIG. 6, produces a net result as shown in FIG. 8, wherein light transmission is plotted against input rotation of the cam.

The coordinated relation of the segments is automatically controlled by an electrical drive, to be described, in a manner such that the net input electrical signal to the image orthicon or pickup tube is within the desired degree of brightness for the most efficient or "best" tube operation. Thus if we assume that in FIGS. 2 and 3 the position is for bright sunlight, as the sunlight gradually fades, due for example to the approach of sunset, the light level will change from a maximum degree of brightness through dusk or the twilight zone and into the night, during which the filter must regulate the transmission of light to always maintain the most efficient operating conditions with the light available. This is accomplished by an electrical drive circuit for two cam-driving motors 27 and 28, FIG. 1, each of which is reversible, which circuit derives power from the photocathode current, which varies in direct proportion to the light falling on the image orthicon photocathode. These motors have a driving connection with cam shaft 18 through a differential gear unit which permits the fast motor to overdrive the slow motor, should a rapid change in light input require a correspondingly rapid repositioning of the filter discs 10 and 11. Since the photocathode current is extremely weak and hence produces an extremely weak signal, it must be amplified.

Referring to FIG. 1, the circuitry and associated components for driving the filter discs have been organized and operatively related to carry out certain desirable operational functions. As heretofore noted, the relative positions of the filter discs should always be such as to maintain an acceptable light level, within a given range, for best operation of the pickup tube. Such range may be considered as "normal." Should the available light vary, then the relative positions of the discs should also vary to keep the degree of light transmission within the normal range. Sometimes variation in available light may be slow, while at other times variation may be relatively rapid. To meet these requirements, the filter discs are rotated in one direction to compensate for increasing light intensity and in the opposite direction to compensate for decreasing light intensity; and they are also driven slowly or rapidly in either direction, depending upon the rapidity of changes in light level.

Figure 5:
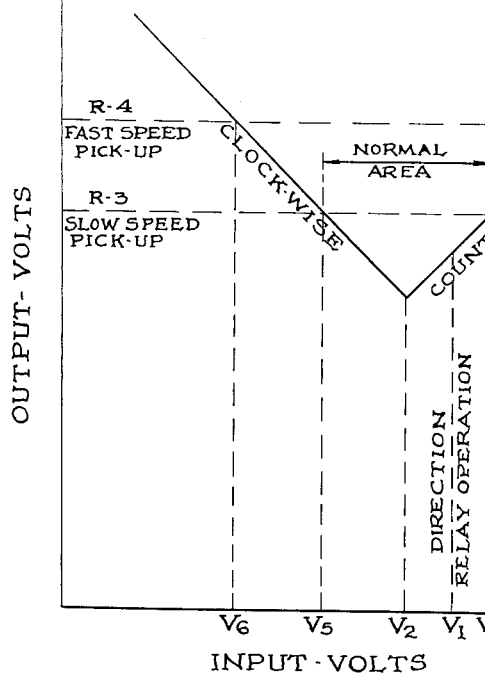
FIG. 5 is a curve chart illustrating the operating characteristics of the amplifier of FIG. 4.

Considering the schematic diagram of FIG. 1, the photocathode current is conducted to a suitable amplifier 29, where the voltage is raised to a workable value, causing a proportionate increase in the flow of current through solenoid 30 of relay R-1 across variable resistor 31; and the output voltage of amplifier 29 is also impressed on a voltage differential amplifier 32, designed to operate on a proportional divergent or V-shaped output v. input curve as illustrated in FIG. 5. The "normal" area which lies within the base of the V in FIG. 5 represents an acceptable light-level filter-positioning voltage range for best operation of the pickup tube T. Should the light level vary from either side of the center ($V_2$) of this "normal" area, the photocathode current will vary proportionally and the output voltage of the amplifier 32 will increase along either the "forward" or "reverse" line of the V of FIG. 5; and when the outermost "light" or "dark" limit is reached, a bank of associated relays will operate and in conjunction with the relay R-1 selectively energize either the motor 27 or 28, which determine the direction and speed of rotation of the filter discs 10 and 11.

There are five relays in the control circuit of FIG. 1, indicated at R-1, R-2, R-3, R-4 and R-5. Relay R-1 controls R-2 and R-5, and these may be considered as direction control relays, since they coact to connect the power source to the clockwise and counterclockwise circuits for the motors 27 and 28, which then drive the filter discs to positions where the photocathode current again falls within the acceptable area at the base of the V (FIG. 5); while relays R-3 and R-4 may be considered as the "slow" and "fast" relays since they respond to the differentiated output signal of amplifier 32 and act through R-5 or R-2 to connect the power source to either the slow or fast driving circuits for said motors.

Figure 4:
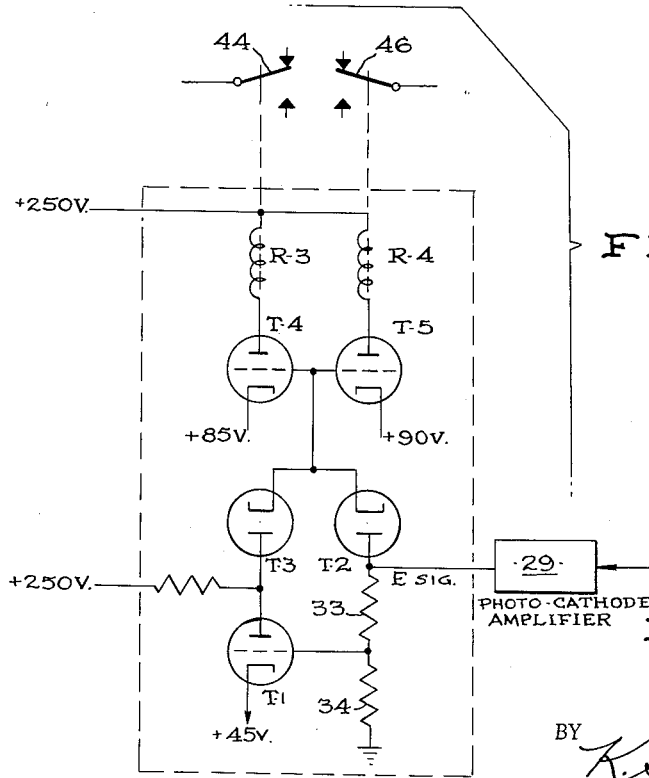
FIG. 4 is an electrical diagram of a differential amplifier incorporated in the electrical drive system.

The differential amplifier 32 is illustrated schematically in FIG. 4. Referring to this figure, the output voltage of photocathode amplifier 29 is impressed directly on the plate circuit of tube T-2 and also on the voltage divider network 33, 34. The relative voltages of the plate and cathode of T-2 are such that the tube will conduct unless the cathode voltage is increased by other means in a manner which will subsequently be described. For the moment, it can be assumed that the signal voltage from amplifier 29 is increasing (moving to the right of $V_2$ in FIG. 5) and is of a value such that the grid of tube T-1 is causing the latter to conduct, which would be the case when the signal voltage is greater than $V_2$ in FIG. 5. When T-2 conducts, it raises the voltage on the grid network of tubes T-4 and T-5, biasing the grids of these latter tubes to a point where they conduct in succession, thereby energizing the solenoids of relays R-3 and R-4 at their appropriate points on FIG. 5.

During the condition as above indicated, the grid of tube T-1 has been biased into the conducting region, holding the voltage on the plate of tube T-3 at a relatively low value. Should the signal voltage from amplifier 29 now drop lower than $V_2$ in FIG. 5, the biasing voltage on the grid of tube T-1 will be reduced and hence reduce the conduction of said tube, whereupon the plate voltage of T-1 and T-3 will increase. As the voltage on the plate circuit of the tube T-3 rises, its cathode voltage will be correspondingly raised, and this will cause the tubes T-4 and T-5 to again conduct in succession. The cathode potentials of tubes T-4 and T-5 are of such relative value when operating in the "normal" area of FIG. 5, that solenoids 43 and 45 of relays R-3 and R-4 will be deenergized.

The manner in which the coordinated electrical and mechanical drive system functions is set forth in the following description of operation:

*Operation*

Let it be assumed that the filter discs 10 and 11 are positioned as shown in FIGS. 1, 2 and 3 (bright light filtering) and that at this time the amplifier 29 is putting out a voltage in excess of $V_1$ of FIG. 5 but less than $V_3$. Under these conditions, the solenoid 30 of relay R-1 will be energized, holding contact switch or arm 35 closed and 36 open. If now the light level decreases, the voltage put out by amplifier 29 will also decrease, and when it drops below $V_1$ of FIG. 5, the current through resistor 31 and solenoid 30 will be such as to cause the latter to deenergize, whereupon contact arm 35 will open and contact arm 36 will close. This results in deenergization of the solenoid 37 of relay R-2, whereupon contact arms 38 and 39 open, and at the same time energization of the solenoid 40 of relay R-5, whereupon contact arms 41 and 42 close. The circuit to motors 27 and 28 is now conditioned for light-level-increase driving when the power comes on, but this will not happen until relay R-3 receives the proper signal from differential amplifier 32, which occurs as the light level decreases to a point where $V_5$ in FIG. 5 is approached, whereupon the solenoid 43 of relay R-3 becomes energized, closing contact arm 44. Power is now applied to the motor 27 and it rotates in a clockwise direction; and it will continue to operate in the same direction, during which time the photocathode current gradually increases to a value such as to produce a voltage slightly greater than at $V_5$ of FIG. 5, or to a value which will bring it into the "normal" area, whereupon the solenoid 43 of relay R-3 will become deenergized, and contact arm 44 will open, stopping the motor 27.

Should the light level decrease at a rate faster than that for which relatively slow rotation of the filters can compensate, then the amplifier 29 will put out a current such that the input voltage to the differential amplifier 32 will approach $V_6$ of FIG. 5, at which time the solenoid 45 of relay R-4 will become energized, closing contact arm 46 and causing fast motor 28 to also rotate in a clockwise direction and overdrive motor 27 through the differential gearing shown in block diagram in FIG. 1. This produces relatively rapid repositioning of the filter discs 10 and 11 to quickly increase the light level to a point where the input voltage will deenergize the solenoids 43 and 45 of relays R-3 and R-4.

If it be assumed that the available outside light increases when the filter discs 10 and 11 are at low or medium light level positions (polaroid axes at less than 90 degrees), and that the voltage lies between $V_5$ and $V_1$ of FIG. 5, then the photocathode current will increase correspondingly in a direction towards $V_1$ of FIG. 5, whereupon the solenoid 30 of relay R-1 will become energized, closing contact arm 35 and opening contact arm 36, thereby energizing the solenoid 37 of R-2 and permitting contact arms 38 and 39 to close, deenergizing the solenoid 40 of R-5 and opening contact arms 41 and 42.

Should the light level continue to increase, the signal voltage put out by amplifier 29 will approach $V_3$ of FIG. 5 and the differential amplifier 32 will produce a current flow such as to cause energization of the solenoid 43 of relay R-3, closing contact arm 44 and hence the circuit to the motor 27 across contact arm 38, whereupon the motor 27 will operate in a counterclockwise direction, positioning the filter discs 10 and 11 for less light input until the light level is brought back within the acceptable or normal area of FIG. 5.

Should the light level increase at a rate faster than can be compensated for through slow rotation of the motor 27, the voltage $V_4$ of FIG. 5 will be approached, and solenoid 45 of relay R-4 will become energized, closing the circuit to "fast" motor 28 across the contact arm 39, causing the said motor to operate in a counterclockwise direction for fast rotation of the filter discs 10 and 11; and this will continue until the filter transmission has compensated for the increased light level and the input signal voltage to differential amplifier 32 correspondingly reduced, whereupon the solenoids 45 and 43 of relays R-4 and R-3 will become deenergized in succession as the light level on the photocathode returns to the acceptable level, the circuit to motor 28 will open and the latter will stop.

Since the refractive properties of the non-polarized segments of the filter discs are the same as those of the polarized segments, the preset focus of the lens system will remain properly oriented irrespective of whether or not polarized segments of the discs are across the light path or whether non-polarized or clear segments thereof are across said path. To illustrate, the focus system is originally set to maintain the most efficient concentration of light rays on the photocathode surface, and when a filter system is interposed between the lens system and photocathode, this preset focus may require some adjustment for best concentration. Thus unless each entire filter disc has the same refractive properties throughout, the focus may be adversely affected when the non-polarized segments are across the light path. This also brings about a certain amount of simplification of the drive system, since the same primary power source, which in the present instance is motivated by changes in the photocathode current, may be used for the entire rotation of the discs; also the cam 17 does not require any special contouring for the maximum light admissibility position of the discs.

What is claimed is:

1. Means for compensating for changes in the intensity of available light admitted to the photocathode of a television pickup tube, comprising a pair of substantially flat disc-like filter members each incorporating segments of light-polarizing material, said members being mounted for rotation through substantially parallel planes to position coacting polarizing segments in overlapping relation across the light path, said members when positioned for maximum light attenuation and hence minimum light transmissibility having the polarizing axes of the polarizing material of one overlapped segment perpendicular to the polarizing axes of the material of the other overlapped segment, said members each having a maximum light-input area devoid of light polarizing material, and means becoming operative as a function of changes in the light passing to said pickup tube for imparting relative rotation to said members to change the polarizing relationship of overlapping segments, the light transmissibility gradually increasing to maximum as the polarizing axes of the material of one overlapped segment are oriented from a perpendicular to a parallel relationship to those of the material of the other overlapped segment, said members when in a position of maximum light input having said devoid areas in registration across the light path.

2. Light compensating means as claimed in claim 1 wherein said filter members each consists of a disc made up of transparent material such as glass or clear plastic having substantially uniform refractive properties throughout and a film of light-polarized material secured to or incorporated in a segment of said disc.

3. Means for compensating for changes in the intensity of available light admitted to the photocathode of a television pickup tube, comprising a pair of filter discs each having an area of substantially 180 degrees incorporating light-polarizing material, means mounting said discs for rotation on a common axis in substantially parallel planes to position coacting polarized segments in overlapping relation across the light path, said discs when positioned for maximum light attenuation and hence minimum light transmissibility having the polarizing axes of the material of one overlapped segment substantially perpendicular to the polarizing axes of the material of the other overlapped segment, and means responsive to changes in photocathode current for imparting relative rotation to said filter discs to change the polarizing relationship of overlapped segments, the light transmissibility gradually increasing to maximum as the discs are relatively rotated to a position where the polarizing axes of the material of the overlapped segments are oriented from a perepndicular to a parallel relationship, and means whereby upon further rotation of said discs the overlapped polarized segments are moved in unison clear of the light path.

4. In a television system, in combination with a television pickup tube, light compensating means including a pair of coacting filter discs each incorporating a predetermined area of light-polarizing material, said discs being mounted for rotation in substantially parallel planes to position coacting polarized segments in overlapping relation across the light path, means interconnecting said discs permitting rotation of one disc relative to the other between positions of maximum and minimum polarized light attenuation, said discs when relatively positioned for maximum light attenuation having the polarizing axes of the material of one overlapped area substantially perpendicular to the polarizing axes of the material of the other overlapped area, the light attenuation gradually decreasing to minimum as one disc is rotated relatively to the other to a position where the polarizing axes of the material of the overlapped areas are oriented from a perpendicular to a parallel relationship, and a rotatable control member in the nature of a contoured cam having a driving connection with one of said discs, said control member being contoured to maintain a substantially linear relationship between cam rotation and light attenuation.

5. A light compensating system as claimed in claim 4 plus electrical means responsive to changes in light attenuation operative to impart rotation to said cam in a clockwise or counterclockwise direction should the degree of light attenuation vary from a predetermined value.

6. A light compensating system as claimed in claim 4 plus electrical control means responsive to changes in light attenuation operative to impart rotation to said cam in a clockwise or counterclockwise direction should the degree of light attenuation vary from a predetermined value, said electrical means being responsive to a signal voltage varying as a function of the degree and rapidity of change of light attenuation to rotate said cam at speeds proportional to said changes.

7. In a television system, in combination with a television pickup tube having a photocathode element, means for compensating for changes in intensity of light to which said tube may be exposed including a pair of coacting filter discs each incorporating a predetermined area of light-polarizing material, said discs being mounted for relative rotation in substantially parallel planes to position coacting segments in overlapping relation across the light path, a rotatable control member having a driving connection with at least one of said discs, variable speed reversible motor means for rotating said control member in a clockwise or counterclockwise direction should the cathode current vary from a predetermined "normal" range, a source of power for said motor means, electrical control circuitry incorporating electrical relays for connecting said source of power to said motor means, and means for controlling said relays including a photocathode current amplifier and means for causing the output voltage of said amplifier to increase or decrease along a proportional V-shaped curve upon a departure of the photocathode current from a predetermined neutral value lying within said "normal" range.

8. In a television system, in combination with a television pickup tube having a photocathode element, means for compensating for changes in the intensity of light to which said tube may be exposed including a pair of coacting filter discs each incorporating a predetermined area of light-polarizing material, said discs being mounted for relative rotation in substantially parallel planes to position coacting segments in overlapping relation across the light path, a rotatable control member having a driving connection with at least one of said discs, "slow" and "fast" speed reversible motor means for rotating said control member in a clockwise or counterclockwise direction should the cathode current vary from a predetermined "normal" range for best tube operation, a source of power for said motor means, control circuitry for said motor means including clockwise and counterclockwise and "slow" and "fast" motor driving circuits; means for energizing said circuits to drive said motor means in a clockwise or counterclockwise direction and at varying speeds in either of said directions comprising a photocathode current amplifier, direction control relay means adapted to be energized from the output of said amplifier whenever the photocathode current varies from said normal range and selectively connect one of said direction control and speed control circuits to said power source, a differentiating amplifier network for the output voltage of said photocathode amplifier effective to increase and decrease the clockwise and counterclockwise driving voltage along a generally V-shaped proportional output v. input curve, and speed control relays associated with said differentiating network adapted to connect one of said "fast" motor circuits to said power source should the photocathode current increase or decrease at a rate in excess of a predetermined compensating rate.

9. In a television system, in combination with a television pickup tube, means for compensating for changes in light to which said tube may be exposed including first and second light polarized filter discs mounted for rotation in substantially parallel planes to position coacting polarized sections in overlapping relation across the light path, means interconnecting said discs permitting rotation of one disc relative to the other between a position of minimum polarized light attenuation and a position of maximum polarized light attenuation, spring means constantly exerting a resilient driving torque tending to rotate said one disc in one direction, a rotatable control member in the nature of a contoured cam tending to restrain rotation by said spring means and drive said latter disc in a reverse direction, and electrical means responsive to changes in photocathode current for controlling said rotatable control member, the contour of said cam being such as to maintain a substantially linear relationship between cam rotation and light attenuation.

10. Means for compensating for changes in available light to which the photocathode of a television pickup tube may be exposed, comprising first and second light-polarized filter discs mounted for rotation on a common axis in substantially parallel planes to position coacting polarized disc segments in overlapping relation across the light path, means interconnecting said discs permitting relative rotation between a position of maximum polarized light attenuation and a position of minimum polarized light attenuation and for limited rotation in unison beyond said latter position to a maximum light-admission position, means constantly exerting a resilient driving torque tending to rotate said first disc in one direction and means resiliently biasing said second disc in the opposite direction, a rotatable control member in the nature of a contoured cam connected to said first disc in a manner such as to restrain it against rotation by its driving spring, electrical means for controlling said rotatable member in response to changes in photocathode current, the biasing means for said second disc exerting less biasing force than the biasing means for said first disc, said discs when positioned for maximum light attenuation having the polarizing axes of one overlapping section substantially perpendicular to the polarizing axes of the other overlapped section, the degree of light attenuation gradually decreasing as the polarizing axes of one overlapped section are oriented from a perpendicular to a parallel relationship to those of the other overlapped section, said discs each having a segment for the said maximum light transmission position, which segments are moved into registration across the light path in response to a low light-level signal from said electrical control means.

11. In a television system, means for compensating for changes in available light to which the photocathode of a television pickup tube may be exposed, comprising first and second substantially flat light-polarized filter discs mounted for rotation on a common axis in substantially parallel planes to position coacting polarized disc segments in overlapping relation across the light path, means interconnecting said discs permitting relative rotation between a position of maximum polarized light attenuation and a position of minimum polarized light attenuation and for limited rotation in unison beyond said latter position to a position for maximum light admission, a rotatable control member in the nature of a contoured cam, a flexible tape connecting said rotatable control member to said first disc, a spring exerting a torsional biasing force tending to rotate said first disc in a direction counter to the rotational holding force exerted by said rotatable member and another spring connected to said second disc exerting a biasing force counter to the biasing force of said first disc, said discs when positioned for maximum light attenuation having the polarizing axes of one overlapped segment substantially perpendicular to the polarizing axes of the other overlapped segment, the degree of light attenuation gradually decreasing to minimum as the polarizing axes of one overlapped section are oriented from a perpendicular to a parallel relationship to those of the other overlapped section, said discs each having a low light-level segment which permits unhindered admission of light to said photocathode, and electrical means responsive to changes in photocathode current for controlling said rotatable control member, said discs following relative rotation thereof to a position of minimum light attenuation being further rotated in unison in response to a low light-level signal from said electrical means to move the low light-level segments in overlapping registration across the light path.

12. In a television system in combination with a television pickup tube, light compensating means including a pair of coacting filter discs each comprising a sheet of transparent material such as glass or clear plastic having substantially uniform reflective properties throughout and a film of light-polarizing material secured to or incorporated in a segment of said disc, the remaining segment of each disc being clear and non-polarized for maximum light transmission, said discs being mounted for rotation on a common axis through substantially parallel planes to position coacting segments thereof in overlapping registration across the light path, and means responsive to change in the intensity of light to which the tube may be exposed for imparting relative angular rotation to at least one of said discs until the non-polarized segments of the discs are brought into registration and thereafter rotating said discs in unison to move said non-polarized segments across the light path.

References Cited in the file of this patent

UNITED STATES PATENTS

| 2,167,484 | Berry | July 25, 1939 |
| 2,398,642 | Homrighous | Apr. 16, 1946 |
| 2,423,321 | Hurley | July 1, 1947 |
| 2,904,694 | Gillette et al. | Sept. 11, 1959 |

FOREIGN PATENTS

| 121,746 | Australia | July 11, 1946 |